No. 863,564. PATENTED AUG. 13, 1907.
J. W. WINKELRIED.
WRENCH.
APPLICATION FILED JUNE 23, 1906.
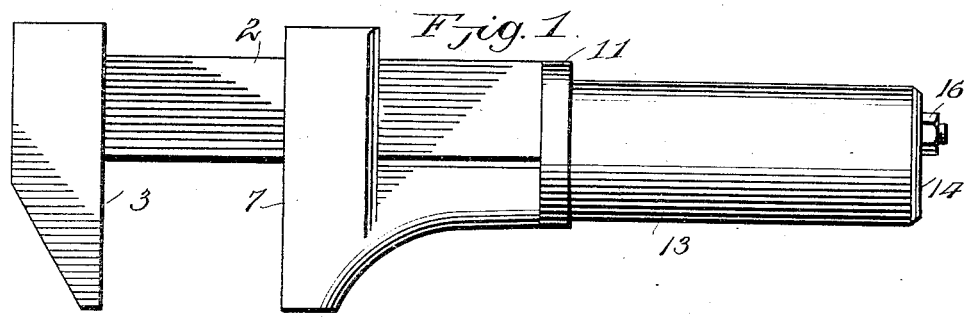
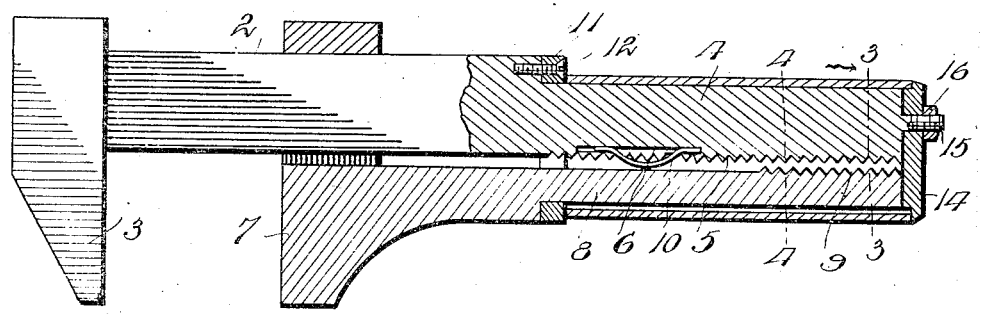
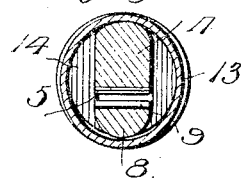
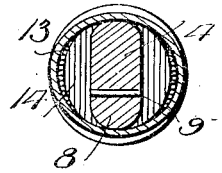
Witnesses
Frank Hough
John F. Byrne
Inventor
J. W. Winkelried
By Victor J. Evans
Attorney

UNITED STATES PATENT OFFICE.

JOSEPH W. WINKELRIED, OF NELSON, BRITISH COLUMBIA, CANADA.

WRENCH.

No. 863,564.　　　Specification of Letters Patent.　　　Patented Aug. 13, 1907.

Application filed June 23, 1906. Serial No. 323,180.

*To all whom it may concern:*

Be it known that I, JOSEPH W. WINKELRIED, a subject of the King of Great Britain, residing at Nelson, British Columbia, in the Dominion of Canada, have invented new and useful Improvements in Wrenches, of which the following is a specification.

My invention relates to wrenches, and its primary object is to provide a novel and highly useful device of this character wherein the movable jaw has a wide range of adjustment, one of which is provided with means by which the movable jaw may be locked securely in adjusted position and released readily and quickly, one which is simple and durable, and one which may be manufactured and sold at a comparatively low cost.

With the above and other objects in view, the invention consists of the construction, combination and arrangement of parts hereinafter fully described, claimed and illustrated in the accompanying drawings, wherein:—

Figure 1 is a side elevation of a wrench constructed in accordance with my invention. Fig. 2 is a similar view, portions of the wrench being in vertical longitudinal section. Fig. 3 is a transverse section on the line 3—3 of Fig. 2, looking in the direction indicated by the arrow, and Fig. 4 is a similar view on the line 4—4 of Fig. 2.

Referring to the drawings by reference numerals, 2 designates a shank which is provided at one end with a fixed jaw 3, and which has its other end reduced to provide a stem 4. The under edge of the stem 4 is provided with teeth 5 and a longitudinally extending recess 6, while the upper edge thereof is rounded. A movable jaw 7 is mounted upon the shank 2 and is provided with a stem 8. This stem is parallel to the stem 4 and a portion of its upper edge is provided with teeth 9, which are adapted to be brought into engagement with the teeth 5 to lock the movable jaw in adjusted position. The movable jaw 7 has a limited independent movement transversely of the shank 2 to permit the teeth 9 to be yieldingly retained out of engagement with the teeth 5 by a leaf spring 10. This spring is secured within the recess 6 by suitably securing one end of the spring to the bottom wall of said recess, and it is bowed at a point intermediate its ends and has its free end disposed and movable in the recess 6.

The movement of the stem 8 by the spring 10 is limited by a ring 11 encompassing the stems and secured in position by a screw 12 let through the ring and threadedly engaging the shank 2. A hollow handle 13, which is oval in cross section throughout a greater portion of its length, is revolubly mounted upon the stems 4—8 and is adapted to be manipulated to either move the stem 8 in the direction of the stem 4 to cause the teeth of the stems to interlock and thus secure the movable jaw 7 in adjusted position, or to permit the stem 8 to be moved away from the stem 4 by the action of the spring 10 to withdraw the teeth from engagement with each other and permit the movable jaw to be adjusted. When the handle is revolved upon the stems to position its greater diameter transversely of the wrench, the stem 8 is free to be moved from the stem 4 by the action of the spring 10, thereby withdrawing the teeth 9 from engagement with the teeth 5 and permitting the movable jaw to be adjusted. When, however, the handle is revolved to position its lesser diameter transversely of the wrench, the stem 8 is moved in the direction of the stem 4, thereby bringing the teeth 9 in engagement with the teeth 5 and locking the movable jaw 7 in adjusted position.

In order to permit the handle to be revolved in a plane concentric with its longitudinal axis, the outer end thereof is circular in cross section and mounted upon a disk 14 carried upon a threaded bolt 15 projecting from the end of the stem 4, said disk being secured in applied position by a nut 16. The disk engages the outer end of the handle 13 in a manner to prevent the handle from becoming accidentally displaced.

From the foregoing description, taken in connection with the accompanying drawings, the construction and mode of operation of the invention should be understood without a further extended description.

Changes in the form, proportions and minor details of construction may be made within the scope of the invention without departing from the spirit or sacrificing any of the advantages thereof.

Having fully described and illustrated my invention, what I claim is:—

A wrench comprising a shank having a fixed jaw at one end and a reduced portion forming a stem and a shoulder, teeth on one side of the stem, a movable jaw having a stem, teeth on the second stem adapted to engage those of the first, a spring arranged between the stems to hold the teeth normally out of engagement, a retaining means on the outer end of the stem of the shank and serving as a bearing, a ring secured against the shoulder of the shank which encircles both stems and forms a bearing and on which the second stem slidably moves, and a sleeve of elliptical cross-section surrounding both stems for engaging or disengaging the teeth of the latter and located with its ends engaging the retaining means and said ring.

In testimony whereof, I affix my signature in presence of two witnesses.

JOSEPH W. WINKELRIED.

Witnesses:
　MAY SMITH,
　JAS. O'SHEA.